Patented Apr. 23, 1929.

1,709,945

UNITED STATES PATENT OFFICE.

WALTER MIEG AND ALBERT JOB, OF ELBERFELD, GERMANY, ASSIGNORS TO GRASSELLI DYESTUFF CORPORATION, OF NEW YORK, N. Y., A CORPORATION OF DELAWARE.

MONONITRATED DIPHTHALOYL ACRIDONES AND PROCESS OF PREPARING THE SAME.

No Drawing. Application filed May 23, 1927, Serial No. 193,723, and in Germany May 27, 1926.

The present invention relates to new monnitrated diphthaloyl acridones of the general formula:

(A)—NO$_2$ in which A means a diphthaloyl acridone, for instance 3.4.5.6-diphthaloyl acridone of the following formula:

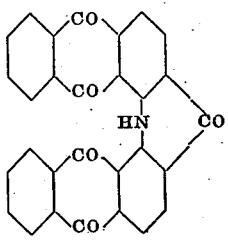

or 1.2.5.6-diphthaloyl acridone of the formula:

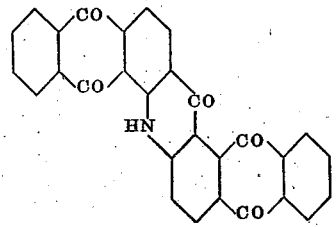

and to a process of preparing the same. The position of the nitro group is not definitely known.

The diphthaloyl acridones are obtainable for example according to the process described in the German Patent 268,219, by condensation of ortho-chloro-anthraquinone carboxylic acids with 1- or 2-amino-anthraquinones and subsequent ring formation by means of sulfuric acid.

In accordance with the present invention our new diphthaloyl acridone derivatives are produced by reacting upon them with nitrating agents, such as for instance strong nitric acid or nitric-sulfric acid. According to the analysis mononitro derivatives seem always to be obtained by this reaction.

The reaction temperatures are varied; for instance, working with nitric-sulfuric acid it will be best to begin the reaction at temperatures of about 5–10° C. and increasing afterwards to about 30–40° C. Working with nitric acid of about 80% strength a very good result is obtained at 80–90° C.

Besides, the process can be carried out with excellent results by nitrating in organic solutions such as nitro benzole, with strong nitric acid of 95% at 120–140° C.

Our new compounds are usually well crystallized powders of yellowish-brown to red color, soluble in concentrated sulfuric acid with reddish shades, and difficulty soluble in organic solutions as for instance, nitro benzole. They are chiefly used as intermediate products for valuable vat dyestuffs.

The following examples will further illustrate our new invention:

*Example 1.*—1 part by weight of 3.4.5.6-diphthaloyl acridone, obtainable according to the German Patent 268,219, Example 1, from 1-chloro-anthraquinone-2-carboxylic acid and 1-amino-anthraquinone and subsequent ring formation by means of sulfuric acid, is heated for some time with 20 parts by weight of nitric acid of about 80% strength to a temperature of about 80–90° C. From the dark brown solution yellowish-brown leaflets rapidly separate. When the quantity of the crystals no longer increases, the mass is cooled and the nitro compound is filtered and washed until neutral. The mono-nitro 3.4.5.6-diphthaloyl acridone crystallizes from nitro benzole in brown-orange needles, soluble in concentrated sulfuric acid with an orange shade.

*Example 2.*—1 part by weight of 1.2.5.6-diphthaloyl acridone, obtainable by condensation of 1-chloro-anthraquinone-2-carboxylic acid with 2-amino-anthraquinone and subsequent ring formation by means of sulfuric acid, is dissolved in 15–20 parts by weight of sulfuric acid and treated at 5–10° C., while stirring, with slightly more than 1 molecule of nitric acid 80%.

The solution is now allowed to stand at 30–40° C. until precipitation of a test portion in water gives blue flakes upon reduction. The mass is then stirred into water, filtered and washed until neutral. The mono-nitro compound obtained crystallizes from nitro benzole in carmine-red needles soluble in concentrated sulfuric acid with a yellowish-red shade.

Another good way is nitrating with strong nitric acid of 95% in 10 parts of nitro benzole at 120–140° C. A mono-nitro derivative is obtained, the analysis of which shows 5.34% nitrogen. (According to theory 5.60% nitrogen has to be obtained for a mono-nitro derivative.)

We claim:

1. Process for the manufacture of a new compound of the anthraquinone series comprising the treatment of 1.2.5.6-diphthaloyl acridone with nitric-sulfuric acid containing slightly more than 1 molecule of nitric acid 80% at temperatures of about 5–10° C. and increasing the temperatures to 40° C.

2. As new products mono-nitrated diphthaloyl acridones obtainable by treating diphthaloyl acridone with nitrating agents, being in dry state brown-orange to carmine-red powders, difficultly soluble in boiling organic solutions and soluble in concentrated sulfuric acid with yellowish to red shades.

3. As a new product a mono-nitrated 1.2.5.6-diphthaloyl acridone obtainable by treating 1.2.5.6-diphthaloyl acridone of the following formula:

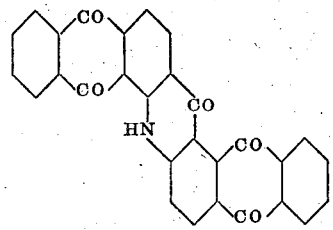

with nitrating agents, being in dry state carmine-red powders, difficultly soluble in boiling organic solutions and soluble in concentrated sulfuric acid with a yellowish-red shade.

In testimony whereof, we affix our signatures.

WALTER MIEG.
ALBERT JOB.